(12) United States Patent
Fattepur

(10) Patent No.: US 10,617,055 B2
(45) Date of Patent: Apr. 14, 2020

(54) DUST RESTRICTOR FOR A FEED ROLLER

(71) Applicant: Deere & Company, Moline, IL (US)

(72) Inventor: Surfraj Fattepur, Bijapur (IN)

(73) Assignee: DEERE & COMPANY, Moline, IL (US)

( * ) Notice: Subject to any disclaimer, the term of this patent is extended or adjusted under 35 U.S.C. 154(b) by 250 days.

(21) Appl. No.: 15/474,106

(22) Filed: Mar. 30, 2017

(65) Prior Publication Data

US 2017/0354081 A1    Dec. 14, 2017

(30) Foreign Application Priority Data

Jun. 14, 2016    (IN) .............................. 201621020276

(51) Int. Cl.
| | | |
|---|---|---|
| *A01B 71/08* | (2006.01) | |
| *A01D 45/02* | (2006.01) | |
| *A01D 45/10* | (2006.01) | |
| *A01F 11/06* | (2006.01) | |
| *A01F 29/06* | (2006.01) | |
| *A01D 61/00* | (2006.01) | |
| *A01D 63/00* | (2006.01) | |

(52) U.S. Cl.
CPC ............ *A01B 71/08* (2013.01); *A01D 45/025* (2013.01); *A01D 45/10* (2013.01); *A01D 61/00* (2013.01); *A01D 63/00* (2013.01); *A01F 11/06* (2013.01); *A01F 29/06* (2013.01)

(58) Field of Classification Search
CPC .... A01D 45/10; A01D 61/004; A01D 61/006; A01D 45/025; A01F 29/06; A01F 11/06; B21K 19/00; B29L 2031/322

USPC ......................................... 492/27–37, 53, 59
See application file for complete search history.

(56) References Cited

U.S. PATENT DOCUMENTS

| | | | | |
|---|---|---|---|---|
| 1,493,626 A * | 5/1924 | Gebhardt | ................ | A01F 11/06 460/31 |
| 2,825,195 A * | 3/1958 | Smith | .................... | A01D 46/12 56/13.5 |
| 3,863,431 A * | 2/1975 | Fowler | .................. | A01D 45/10 56/11.9 |
| 3,995,520 A * | 12/1976 | Spargo | .................. | A01D 45/10 83/345 |
| 4,194,260 A * | 3/1980 | Culp | ...................... | B65G 45/14 15/230.14 |
| 4,524,572 A * | 6/1985 | Wilde | .................. | A01D 45/008 171/28 |
| 4,790,128 A * | 12/1988 | Klinner | .................. | A01D 41/06 56/364 |
| 5,040,361 A * | 8/1991 | Briesemeister | ...... | A01D 45/025 56/104 |

(Continued)

FOREIGN PATENT DOCUMENTS

| | | | | |
|---|---|---|---|---|
| DE | 102013109678 B3 * | 1/2015 | ........... | A01D 89/002 |
| FR | 2535156 A1 * | 5/1984 | ............. | A01F 11/06 |

*Primary Examiner* — Alicia Torres
(74) *Attorney, Agent, or Firm* — Taft Stettinius & Hollister LLP; Stephen F. Rost

(57) ABSTRACT

A dust restrictor is provided for eliminating dust and dirt accumulation between surfaces. The dust restrictor includes at least one dust restricting element and an attachment mechanism. The dust restricting element is disposed in a dust accumulating area of an arrangement. The attachment mechanism is provided for fixing each of the dust restricting elements to the dust accumulating area.

18 Claims, 4 Drawing Sheets

(56) References Cited

U.S. PATENT DOCUMENTS

| | | | | |
|---|---|---|---|---|
| 7,237,373 B2 * | 7/2007 | Resing | ................ | A01D 45/025 |
| | | | | 56/104 |
| 2004/0250523 A1 * | 12/2004 | Schulz | ................... | A01F 12/10 |
| | | | | 56/153 |
| 2007/0022726 A1 * | 2/2007 | Ferre | ..................... | A01D 82/02 |
| | | | | 56/14.1 |
| 2011/0143899 A1 * | 6/2011 | Wirth | .................... | A01D 46/12 |
| | | | | 492/45 |

* cited by examiner

DUST RESTRICTOR FOR A FEED ROLLER

RELATED APPLICATIONS

This application claims the benefit of Indian Application Ser. No. 201621020276, filed on Jun. 14, 2016, the disclosure of which is hereby expressly incorporated by reference in its entirety.

FIELD OF THE DISCLOSURE

The present disclosure relates to the field eliminating dust and dirt accumulation between metallic surfaces.

BACKGROUND

Accumulation of debris, such as, dust and dirt in spaces defined between metal parts poses several problems. Problems are especially accentuated in case wherein operation is required to be halted in order to clean the accumulated debris. Such problems are particularly faced in case off-road vehicles, such as, harvesters. For example, in case of sugarcane harvester, debris tends to get accumulated in the spaces provided between the radially spaced apart plates in feed rollers. This accumulated debris is required to be scraped out regularly to enable the feed rollers to run smoothly, thereby avoiding increased load on motors and reducing bearing life. However, the harvester is required to be halted in order to clean out the debris which results in unproductive time of harvester. The feed rollers are made of metal, and accumulated debris causes metal corrosion.

Hence, there is a need to avoid accumulation of debris.

SUMMARY

In one embodiment of the present disclosure, a dust restrictor includes at least one profiled dust restricting element and an attachment means. The at least one profiled dust restricting element is disposed in a dust accumulating area of an arrangement. The attachment means is provided for fixing each of the dust restricting elements to the dust accumulating area. The attachment means is an adhesive or a fastener.

In one example, the dust restricting element is made of a polymeric material selected from the group consisting of a thermoset material, a thermoplastic material and a natural polymer. In a second example, the dust restricting element is in the form of a profiled sheet complementing the shape of the dust accumulating area. In a third example, the dust restricting element is of a required thickness. Alternatively, the dust restricting element is in the form of a solid block, profiled to complement the shape of the dust accumulating area. In a further example, the dust restricting element is a single piece member. A plurality of the dust restricting elements is arranged on the dust accumulating area, depending on requirement. In yet a further example, the dust restricting element is provided in space between feed plates of feed rollers in a harvester. The dust restricting element has a cross-section corresponding to the cross-section of the dust accumulating area.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
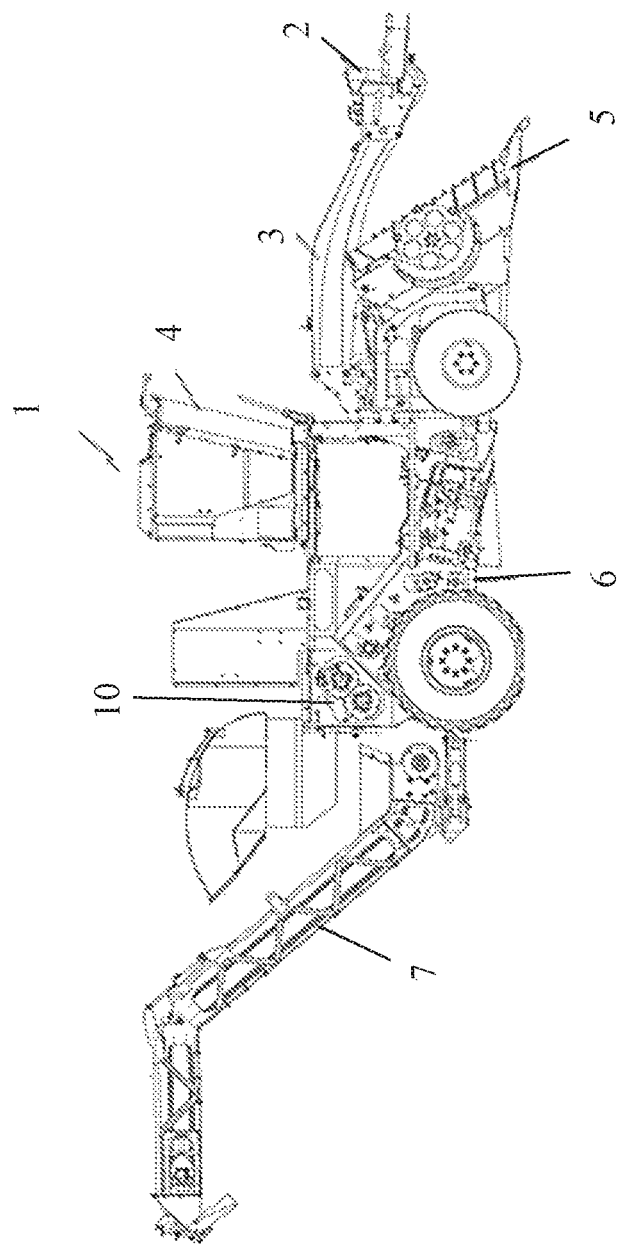
FIG. 1 is a side view of a sugarcane harvester.

FIG. 1 illustrates a sugarcane harvester and is generally designated as 1, includes a top chopper 2 pivotally mounted by parallel arms 3. A pair of crop dividers 5 is arranged at the front end of the operator cab 4 and below the arms 3. A base cutter (not shown in Figure) enables cutting of the stalked crop from the base. The whole stalked sugarcane is fed by feed roller unit 6, in accordance with the present disclosure, into a chopper mechanism 7. The whole stalked sugarcanes are cut into billets by the chopper mechanism 7. Thereby sugarcane billets are conveyed from the chopper mechanism 7 via an elevator 9 to be loaded into a carrier vehicle (not shown in Figure) for transporting the billets for end usage. The feed rollers 6 operate to feed cane into chopper mechanism 7 to chop the canes into billets. While feeding cane most of the debris, such as, dirt and mud, sticks to the feed rollers 6. The debris need to be scraped off from the feed rollers 6 for smooth operation of the feed rollers 6 and increasing bearing life. The accumulated debris if not removed, corrodes the base material of the feed rollers 6 which reduces the life of the feed rollers 6. This problem is particularly common with the lower feed rollers compared to the top feed rollers. Hence, the present disclosure provides for a dust restrictor to prevent accumulation of debris in feed rollers 6, particularly the lower feed rollers. Although the dust restrictor, in accordance with the present disclosure will hence forth be explained with regards to feed rollers, however, a person skilled in the art will appreciate that the dust restricting element can be used to prevent accumulation of debris in any space defined between parts.

Figure 2:
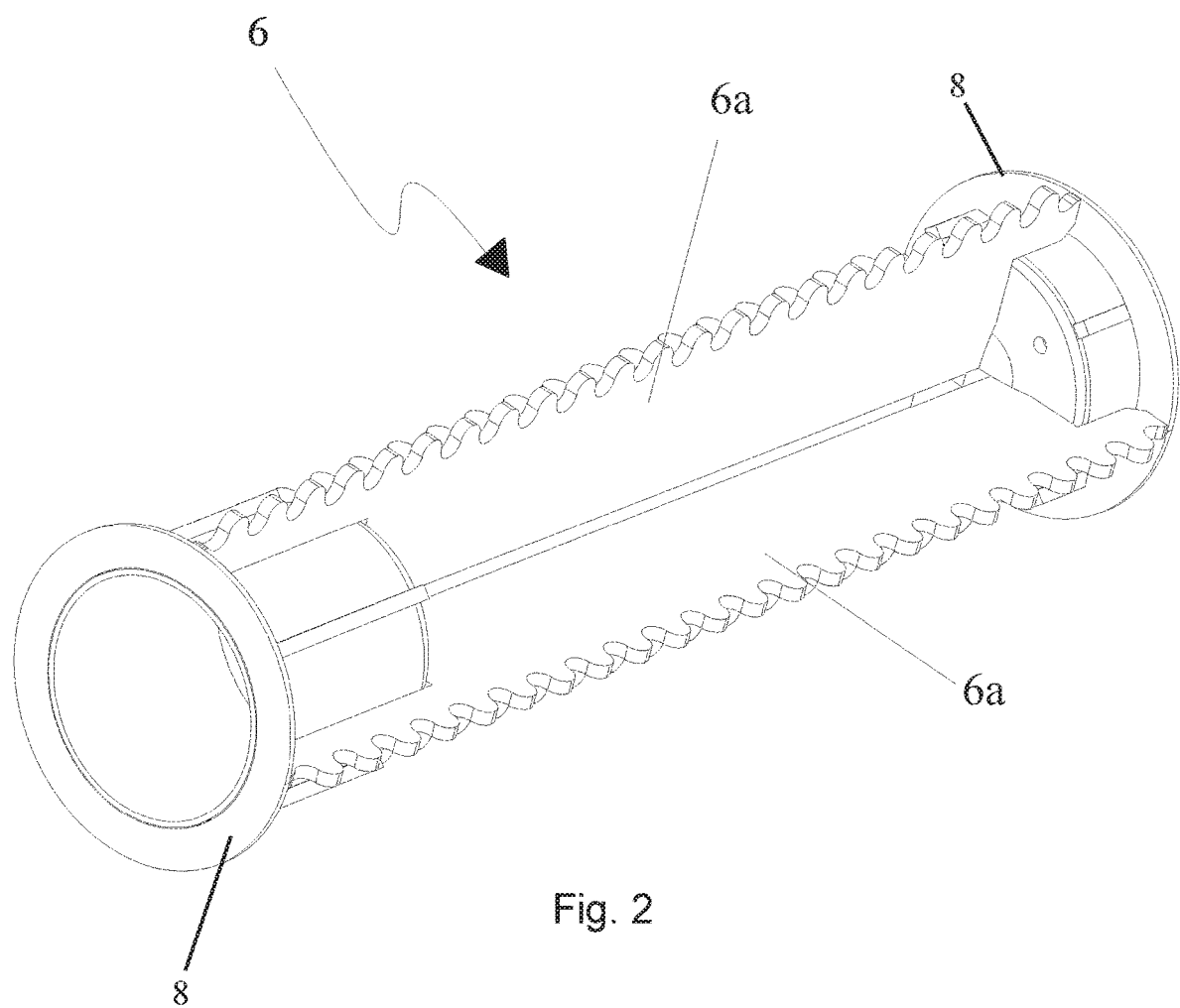
FIG. 2 is a perspective view of a feed roller of a sugarcane harvester.

FIG. 2 illustrates a presently available feed roller 6 having a plurality of radially spaced apart adjacent feed plates 6a. The feed plates 6a are mounted between on hubs 8. The accumulation of debris take place in the space defined between the feed plates 6a, particularly on the surface of the feed plates 6a. The debris is prevented from being accumulated in the space, by means of a dust restrictor comprising of a dust restricting element and an attachment means.

Figure 3:
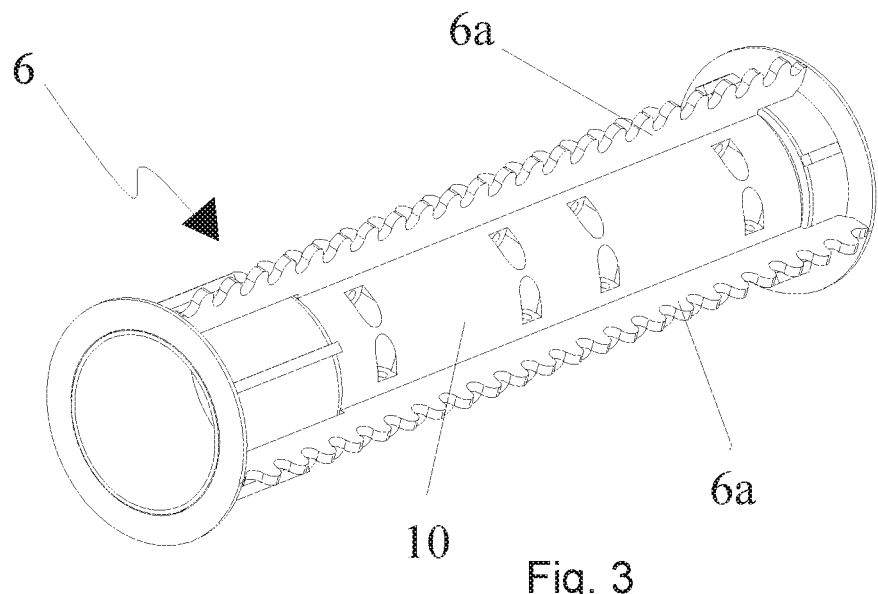
FIG. 3 is a perspective view of a dust restricting element provided on the feed roller of FIG. 2.
Figure 4:
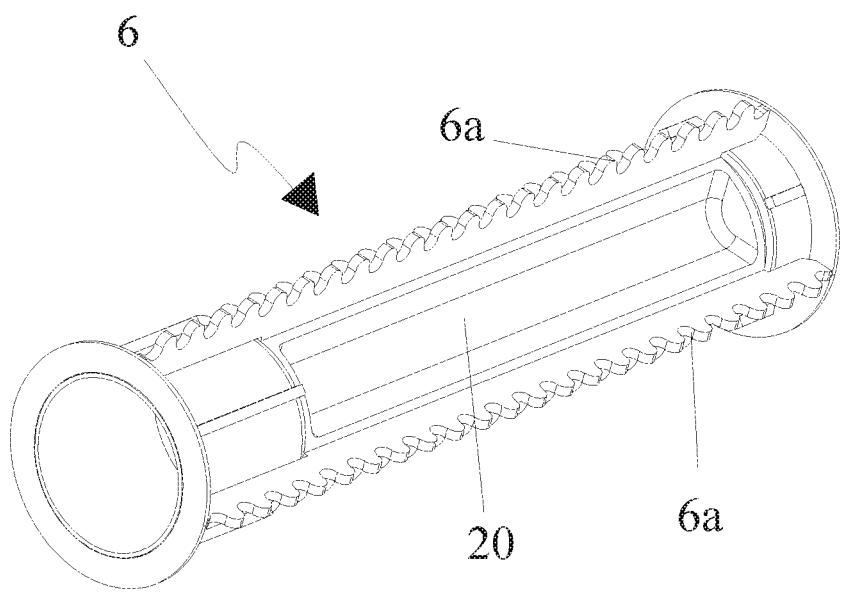
FIG. 4 is a perspective view of an alternate embodiment of a dust restricting element.

FIG. 3 illustrates the dust restricting element 10 in accordance with one embodiment mounted in the feed roller 6 while FIG. 4 illustrates the dust restricting element 20 in accordance with another embodiment mounted in the feed roller 6. The dust restricting element 10 and the dust restricting element 20 are specifically illustrated in FIG. 5 and FIG. 6, respectively. The dust restricting element 10 and the dust restricting element 20 are made of polymeric material, such as, a natural polymer, a thermoset material or a thermoplastic material.

Figure 5:
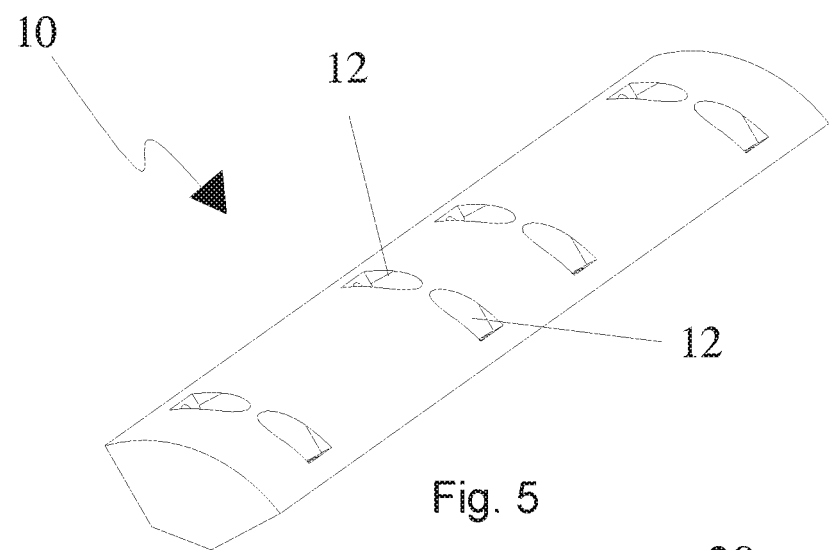
FIG. 5 is a schematic of the dust restricting element of FIG. 3.

The dust restricting element 10, in accordance with an embodiment, particularly illustrated in FIG. 3 and FIG. 5, is a solid block profiled to complement the space defined between adjacent feed plates 6a of the feed roller 6. This prevents debris from contacting and accumulating in the dust accumulating areas of the feed roller 6.

Figure 6:
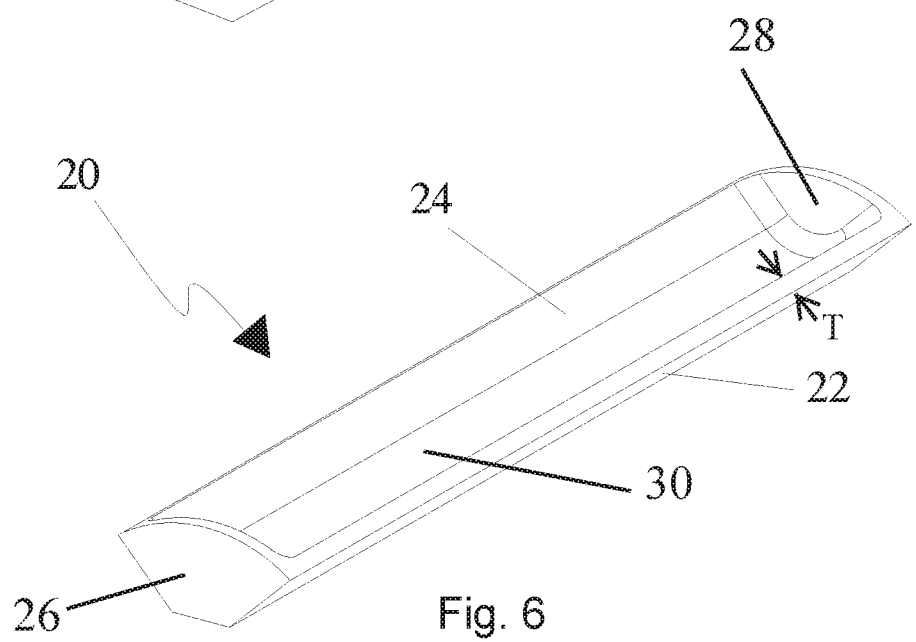
FIG. 6 is a schematic of the dust restricting element of FIG. 4.

In accordance with another embodiment of the dust restricting element 10, the dust restricting element 20, illustrated in FIG. 4 and FIG. 6, is in the form of a profiled sheet complementing the shape of the dust accumulating area. The profiled sheet is of a required thickness T. The dust restricting element 20 are provided with surfaces 24, 22, 26, 28 and 30 for lining the surface of the dust accumulating area of the feed roller 6, such as, the feed plates 6a and the hubs 8. This prevents debris from contacting, accumulating and adhering to the dust accumulating areas of the feed rollers 6.

The dust restricting element 10 and the dust restricting element 20 are mounted in the space between the adjacent feed plates 6a of the feed roller 6 by means of the attachment means, such as, adhesive or fastener. As illustrated in FIG. 5, the dust restricting element 10 is provided with a plurality of mounting openings 12. The fasteners 11 are inserted through the mounting openings 12 so as to fasten the dust restricting element 10 to the surfaces of the feed roller 6 defining the space between the feed plates 6a of the feed roller 6. Alternatively, the dust restricting element 10 and the dust restricting element 20 are adhesively mounted to the surfaces of the feed roller 6 defining the space between the feed plates 6a of the feed roller 6. Due to the property of polymeric material to prevent adherence of particles thereon, the dust restricting element 10 and the dust restricting element 20 prevent the debris from accumulating and adhering thereon. Also, the dust restricting element 10 and the dust restricting element 20 seals substantial portion of the space defined between adjacent feed plates 6a, thereby preventing accumulation of debris within the space. The dust restricting element 10 and the dust restricting element 20 has a cross-section corresponding to the cross-section of the dust accumulating area.

The dust restricting element 10 or the dust restricting element 20 are provided as a single piece member spanning between the hubs 8. Alternatively, depending on requirement, a plurality of dust restricting element 10 or the dust restricting element 20 are arranged on said dust accumulating area spanning between the hubs 8.

Thus, the dust restrictor, in accordance with the present disclosure, prevents debris from being accumulated and adhered to in dust accumulating areas of the feed roller 6. This helps in increasing the life and efficiency of the feed roller and also improving life of associated bearings and motors.

In this disclosure, the embodiments shown and described herein may minimize an accumulation of debris, reduce downtime of a machine due to debris accumulation, and increase a life of bearing and motors operating the machine.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A dust restrictor comprising:
   at least one profiled dust restricting element disposed in a dust accumulating area of an arrangement including a feed roller of a harvester, the feed roller including a first feed plate and a second feed plate arranged at a non-parallel angle to the first feed plate such that the dust accumulating area is defined in a space between the first feed plate and the second feed plate; and
   an attachment means for releasably fixing said at least one profiled dust restricting element to said first feed plate and said second feed plate within said dust accumulating area;
   wherein said at least one profiled dust restricting element is disposed in the space between the first feed plate and the second feed plate;
   wherein said at least one profiled dust restricting element is shaped to conform to the space between the first feed plate and the second feed plate, and includes a convex outer profile;
   wherein the at least one profiled dust restricting element comprises a first opening and a second opening;
   wherein said attachment means comprises a first fastener operable to extend through said first opening to secure the at least one profiled dust restricting element to said first feed plate; and
   wherein said attachment means further comprises a second fastener operable to extend through said second opening to secure the at least one profiled dust restricting element to said second feed plate.

2. The dust restrictor of claim 1, wherein said dust restricting element is made of a polymeric material selected from the group consisting of a thermoset material, a thermoplastic material and a natural polymer.

3. The dust restrictor of claim 1, wherein said dust restricting element is in the form of a profiled sheet complementing the shape of the dust accumulating area.

4. The dust restrictor of claim 1, wherein said dust restricting element is in the form of a solid block, profiled to complement the shape of the dust accumulating area.

5. The dust restrictor of claim 1, wherein said dust restricting element comprises a defined thickness.

6. The dust restrictor of claim 1, wherein said dust restricting element comprises a single piece member.

7. The dust restrictor of claim 1, wherein a plurality of said dust restricting element are arranged on said dust accumulating area.

8. The dust restrictor of claim 1, wherein said dust restricting element comprises a cross-section corresponding to the cross-section of the dust accumulating area.

9. An apparatus, comprising:
   a feed roller for a harvester, the feed roller comprising a plurality of angularly-spaced feed plates; and
   a profiled dust restricting element secured to the feed roller in a space between two adjacent plates of the plurality of plates;
   wherein an inner profile of the profiled dust restricting element is shaped to conform to the space between the two adjacent plates;
   wherein an outer profile of the profiled dust restricting element is curved;
   wherein the profiled dust restricting element is operable to be removed from the feed roller as a single-piece construction;
   wherein the profiled dust restricting element comprises a plurality of openings; and
   wherein the profiled dust restricting element is attached to the feed roller by fasteners positioned in the openings and extending into the two adjacent plates.

10. The apparatus of claim 9, wherein the profiled dust restricting element is secured to the feed roller via attachment means.

11. The apparatus of claim 9, wherein the profiled dust restricting element is formed of a polymeric material.

12. The apparatus of claim 9, wherein an outer surface of the profiled dust restricting element has one of a convex profile or a concave profile.

13. A dust restrictor, comprising:
- a profiled dust restricting element sized and shaped to be mounted to a feed roller in a space between two adjacent plates of the feed roller; and
- attachment means for securing the profiled dust restricting element to each of the two adjacent plates and within the space between the two adjacent plates, wherein the attachment means comprises first attachment means for securing the profiled dust restricting element to a first plate of the two adjacent plates, and wherein the attachment means comprises second attachment means for securing the profiled dust restricting element to a second plate of the two adjacent plates;
- wherein an inner profile of the profiled dust restricting element is shaped to conform to the space between the two adjacent plates;
- wherein an outer profile of the profiled dust restricting element is one of a convex profile or a concave profile; and
- wherein the profiled dust restricting element comprises a solid block defining the inner profile and the outer profile.

14. The dust restrictor of claim 13, wherein the profiled dust restricting element is formed of a polymeric material.

15. The dust restrictor of claim 13, wherein the attachment means comprises at least one of a fastener or an adhesive.

16. The dust restrictor of claim 1, wherein the attachment means is configured to releasably secure the at least one profiled dust restricting element to said first feed plate and said second feed plate such that the at least one profiled dust restricting element is operable to be removed from said first feed plate and said second feed plate as a single-piece construction.

17. The dust restrictor of claim 13, wherein the profiled dust restricting element comprises a first opening positioned for alignment with the first plate, and a second opening positioned for alignment with the second plate; wherein the first attachment means comprises a first fastener sized and shaped to extend into the first plate via the first opening; and wherein the second attachment means comprises a second fastener sized and shaped to extend into the second plate via the second opening.

18. The dust restrictor of claim 13, wherein each of the first attachment means and the second attachment means comprises at least one of a fastener or an adhesive.

* * * * *